(12) United States Patent
Fini et al.

(10) Patent No.: US 8,747,096 B2
(45) Date of Patent: Jun. 10, 2014

(54) FIXING SYSTEM OF A HALF-DIE TO A TRAVERSE OF A PRESS

(75) Inventors: Marco Fini, Bologna (IT); Rossano Mosca, Caerano di San Marco (IT)

(73) Assignee: Sacmi Cooperativa Meccanici Imola Societa' Cooperativa, Imola (Bologna) (IT)

(*) Notice: Subject to any disclaimer, the term of this patent is extended or adjusted under 35 U.S.C. 154(b) by 0 days.

(21) Appl. No.: 13/817,303

(22) PCT Filed: Feb. 8, 2012

(86) PCT No.: PCT/IB2012/000241
§ 371 (c)(1),
(2), (4) Date: Feb. 15, 2013

(87) PCT Pub. No.: WO2012/114173
PCT Pub. Date: Aug. 30, 2012

(65) Prior Publication Data
US 2013/0142900 A1    Jun. 6, 2013

(30) Foreign Application Priority Data
Feb. 24, 2011 (IT) .............................. RE2011A0011

(51) Int. Cl.
*B29C 33/30* (2006.01)
(52) U.S. Cl.
USPC ...................................... 425/192 R; 425/195

(58) Field of Classification Search
CPC ........................ B29C 33/305; B29C 45/1743
USPC ............................................. 425/192 R, 195
See application file for complete search history.

(56) References Cited

U.S. PATENT DOCUMENTS

| | | | | |
|---|---|---|---|---|
| 4,116,599 A | * | 9/1978 | Ruegg | 425/192 R |
| 5,078,586 A | | 1/1992 | Holzschuh | |
| 5,486,101 A | * | 1/1996 | Guyon | 425/192 R |
| 6,244,780 B1 | | 6/2001 | Hansson | |

FOREIGN PATENT DOCUMENTS

DE            3331676 A1    3/1985

* cited by examiner

*Primary Examiner* — James Mackey
(74) *Attorney, Agent, or Firm* — Volpe and Koenig, P.C.

(57) ABSTRACT

A system includes a plane or a plate constituting a mobile traverse or a fixed platen of a press, a half-die associated to the traverse, at least a first hole afforded in the traverse or in the half-die and aligned with a second hole afforded respectively in the half-die or in the traverse, a third hole intersecting the second hole and opening externally on an edge of the traverse or the half-die, connector having a part blocked in the first hole and a part inserted in the second hole, blocking member activatable from outside located in the third hole such as to act on the part of the connector inserted in the second hole, where the first hole and the part of the connector inserted therein are independent of the orientation of the connector in the first hole.

8 Claims, 4 Drawing Sheets

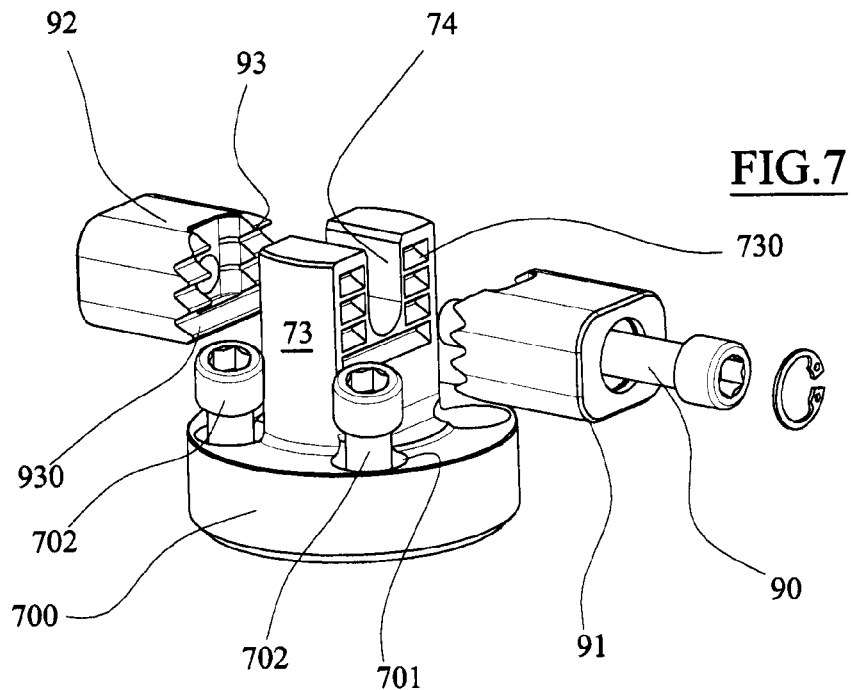
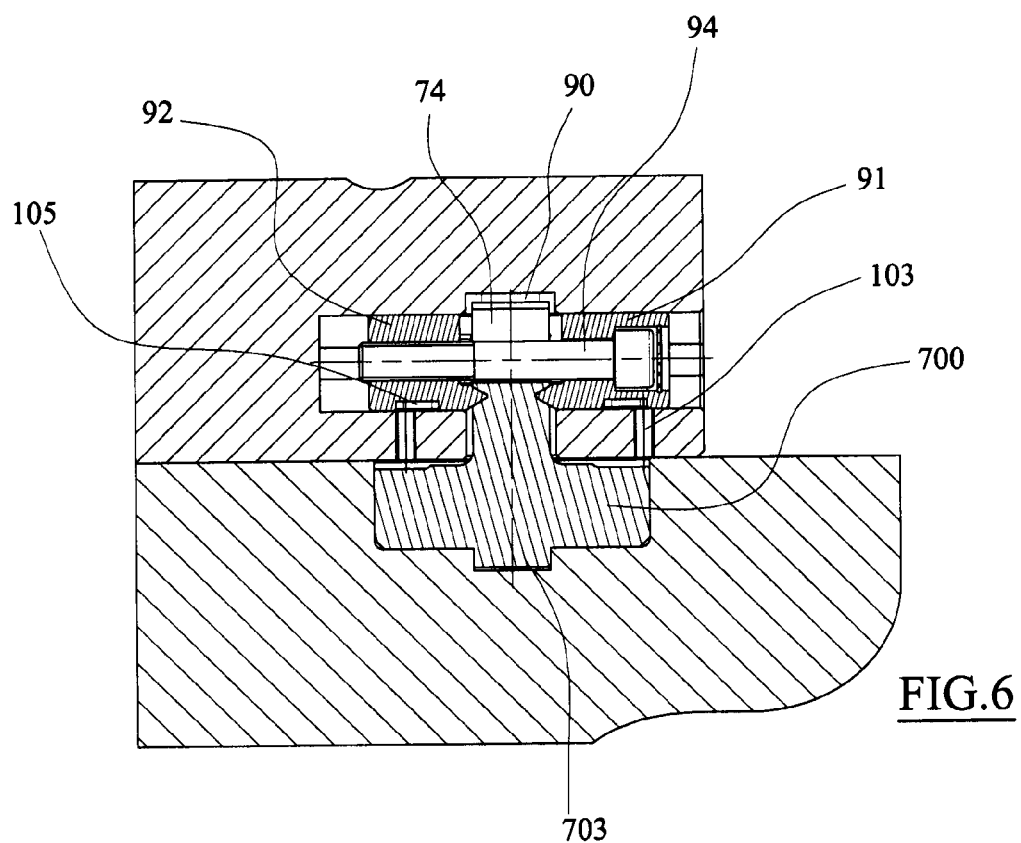

FIXING SYSTEM OF A HALF-DIE TO A TRAVERSE OF A PRESS

TECHNICAL FIELD

The present invention relates in general to presses, in particular to presses for injection of plastic material.

BACKGROUND ART

This type of machine comprises a fixed platen and a mobile traverse which nears and distances from the fixed platen on a horizontal axis.

Each of the two members, the platen and the traverse, bears a half-die provided with one or more moulds destined to combine perfectly with the mould of the other half-die.

The fixed platen bears a fixed half-die which is associated with precision to a nozzle which injects the plastic material in the molten, liquid or pasty state.

Each of the two members, the platen and the traverse, has a plate-shape and bears a series of threaded holes, generally at least two in number, more often six, which serve to fix the half-die to the member by means of a screw.

The fixing operation of the half-die to the member is very laborious, and comprises positioning the half-die on the member, inserting and fastening the screws of the respective holes, thus performing a pre-tightening, nearing the two half-dies up to achieving a perfect combination, and then performing the final tightening.

This operation, very costly in terms of time, has to be repeated each time the die is to be changed, which, given the high productivity of this type of machine is done with a certain frequency and implicates long down times which have a negative influence on productivity.

Thus the problem of realising a fastening system of the half-die to the traverse and platen of the press which involves only short operating times while preserving the necessary precision of fixing is very relevant.

General rapid fastening means are known in the prior art, described for example in document U.S. Pat. No. 6,244,780.

Document U.S. Pat. No. 6,244,780 relates to the fastening of a cutting tool to a respective activating spur, and exhibits no problem of orientation of the tool in relation to the support.

The fastening devices described in this document comprise two parts destined to be separately associated to the pieces to be assembled.

A first part comprises a threaded spur screwed into a hole present in one of the two pieces to be assembled.

The spur has a cylindrical portion that projects from the surface of the piece, which portion is destined to insert in a complementary first hole present in the other part to be assembled.

The external surface of the cylindrical portion comprises first parallel channels having a triangular section and a constant pitch, and a seating parallel to the axis which separates the cylindrical part into two symmetrical appendages.

A second part comprises a sort of clamp suitable for being associated to the other piece to be assembled and destined to clamp the projecting part of the first part.

The second part exhibits a first hole for receiving the appendages and a second hole opening externally of the piece.

The second hole exhibits an axis which intersects the axis of the first hole and is destined to receive a through-bolt having an end destined to screw into a first nut snugly inserted in the second hole, and to slidably house a second nut similar to the first.

The two nuts are connected by a single bolt which, when the parts are assembled, is located in the seating.

The nuts have facing surfaces thereof provided with triangular-section channels complementary with the external channels of the appendages of the cylindrical portion.

The assembly of the two parts is obtained by screwing the threaded spur into the complementary hole present in one of the two pieces to be assembled, by inserting the appendages projecting from the spur into the complementary hole present in the other part, and tightening the two nuts connected by the bolt up to co-penetrating the channels thereof in the channels of the appendages.

The orientation of the spur in the hole in which it is screwed is entirely random, as will be the reciprocal orientation of the two pieces.

The above-described fastening devices exhibit the drawback of not being able to guarantee perfect blocking of the spur in the respective hole, and thus maintaining the desired reciprocal orientation between the two assembled pieces, since the two appendages deriving from the spur have to have an orientation which is compatible with the orientation of the axis of the second hole opening externally of the piece.

The structures of the prior art are not suitable for application where there is a need for a perfect fastening of the spur, respective a compulsory orientation between the two parts to be assembled.

The problem increases when at least two fastening devices are to be provided between two parts to be assembled.

The structures of the prior art are in particular unsuitable for fixing a half-die to the mobile traverse of a press, as the half-die has to be fixed to at least two points to the traverse by means of two fastening devices having different and predetermined orientations.

Examples of such fastening devices, according to the preamble of the claim 1, are described in DE 33 31 676 and in U.S. Pat. No. 5,078,586.

DISCLOSURE OF INVENTION

The aim of the present invention is to provide a fastening system of the above-described type, which enables rapid and correct mounting and demounting of a half-die to the mobile traverse and the fixed platen of a press, especially a press for injection of plastic material.

The aim is attained by the fastening system having the characteristics described in the independent claim.

The system of the invention comprises a device of the above-cited type having means for blocking the two appendages to one of the two parts to be assembled, with a desired orientation which does not depend on the degree of tightening, but is a function only of the orientation of the second part of the fastening device.

BRIEF DESCRIPTION OF DRAWINGS

The constructional and functional advantages and characteristics will emerge from the detailed description that follows, with the aid of the figures of the accompanying drawings, which illustrated a particular preferred embodiment thereof, given by way of non-limiting example.

FIG. 6 is a second of a detail of a different embodiment of the invention.

FIG. 7 is a larger-scale detail of FIG. 6.

BEST MODE FOR CARRYING OUT THE INVENTION

Figure 1:
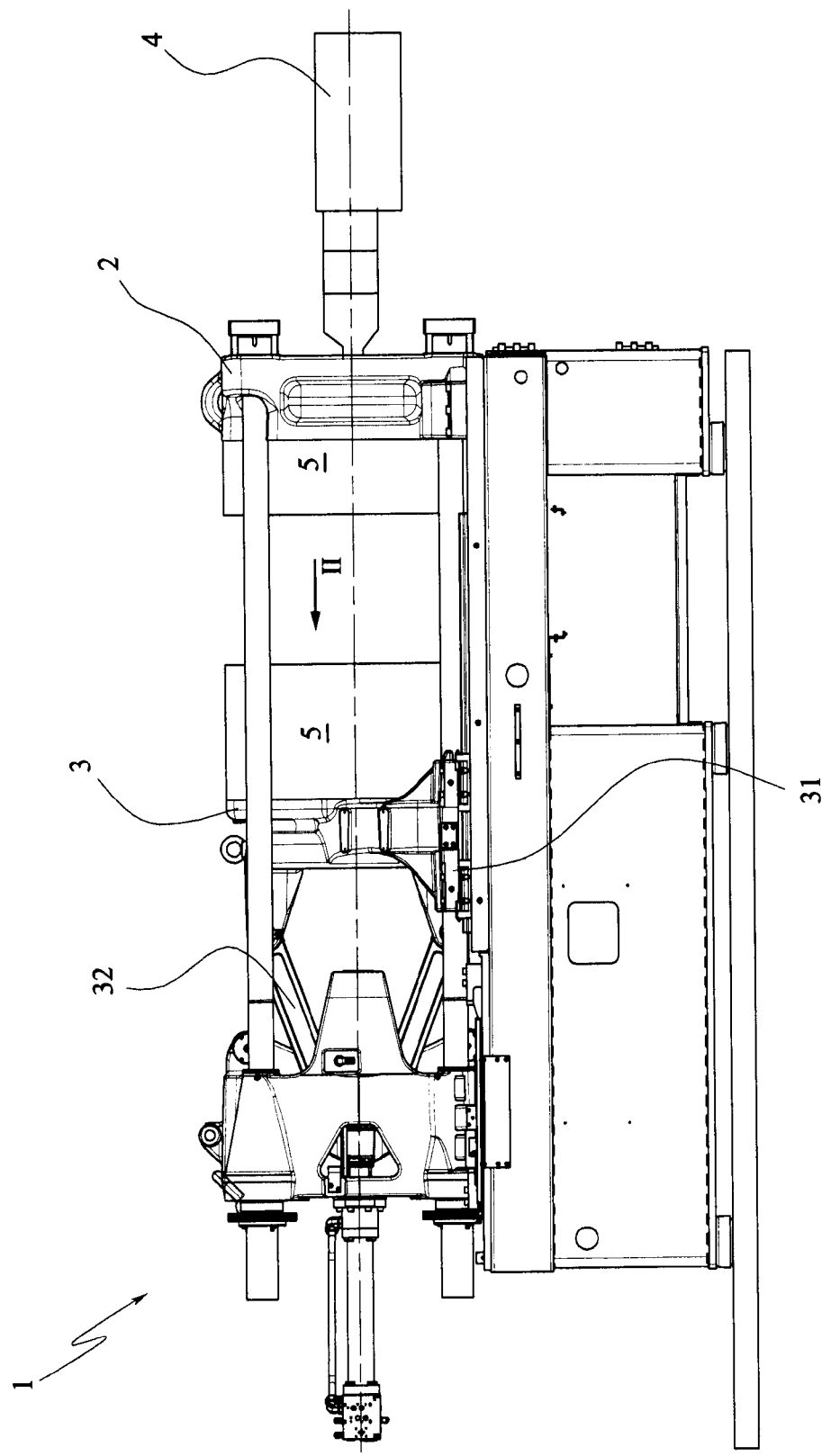
FIG. 1 show a side view of a press for injection of plastic material.
Figure 3:
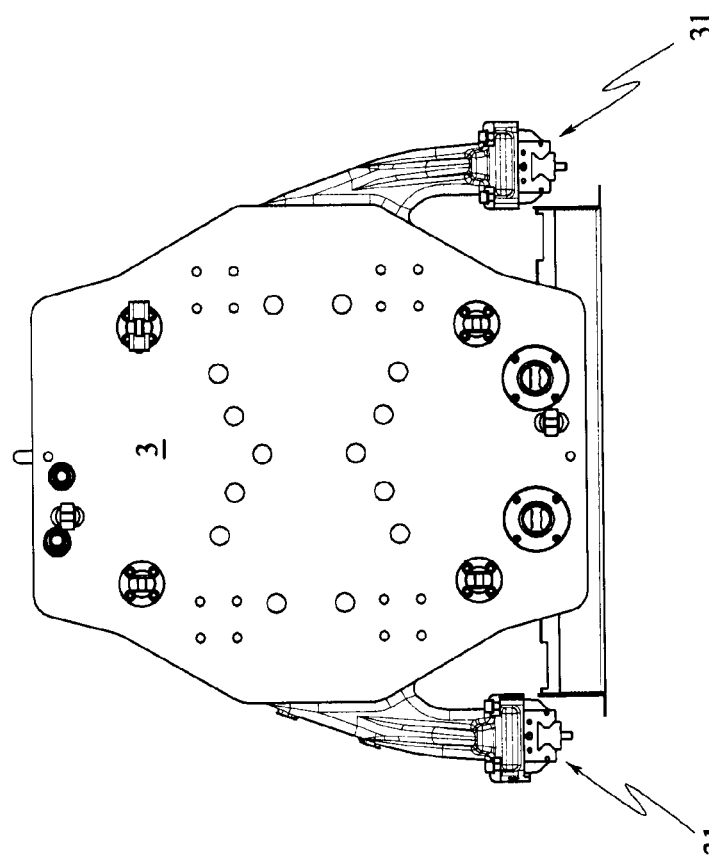
FIG. 3 is the front view of the mobile traverse.
Figure 2:
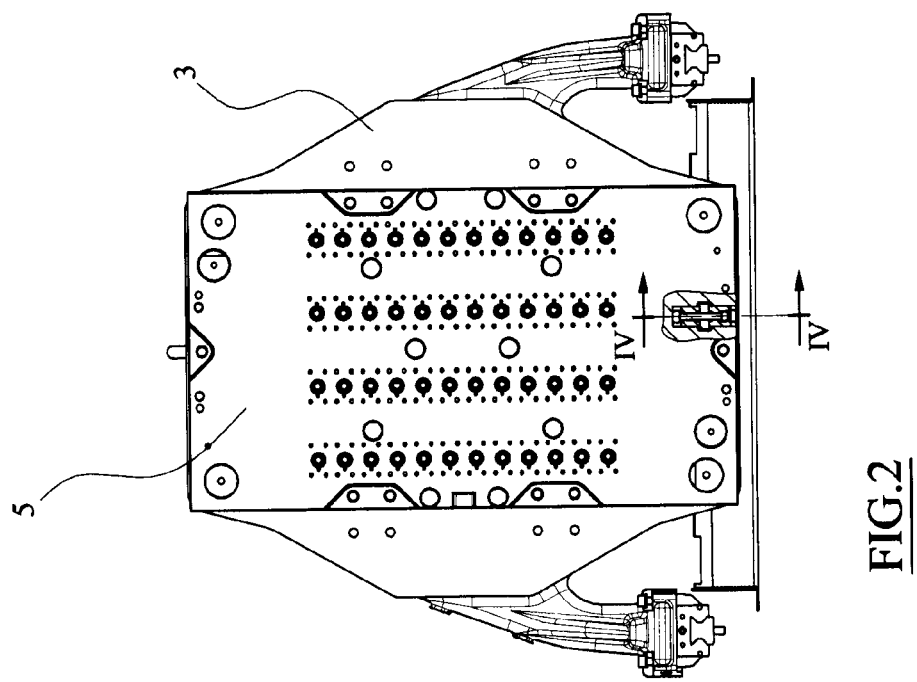
FIG. 2 is the view from II of FIG. 1.

The figures illustrate a press 1 provided with a fixed platen 2 and a mobile traverse 3 which slides on two guides 31, activated by a hydro-mechanical toggle system 32.

A known plastic material injection system is associated to the fixed platen 2. The following is equally applicable either to the fixed platen 2 or the traverse 3.

A half-die 5 is fastened to both the mobile traverse 3 and the fixed platen 2, by means of at least two fastening devices described herein below.

Figure 5:
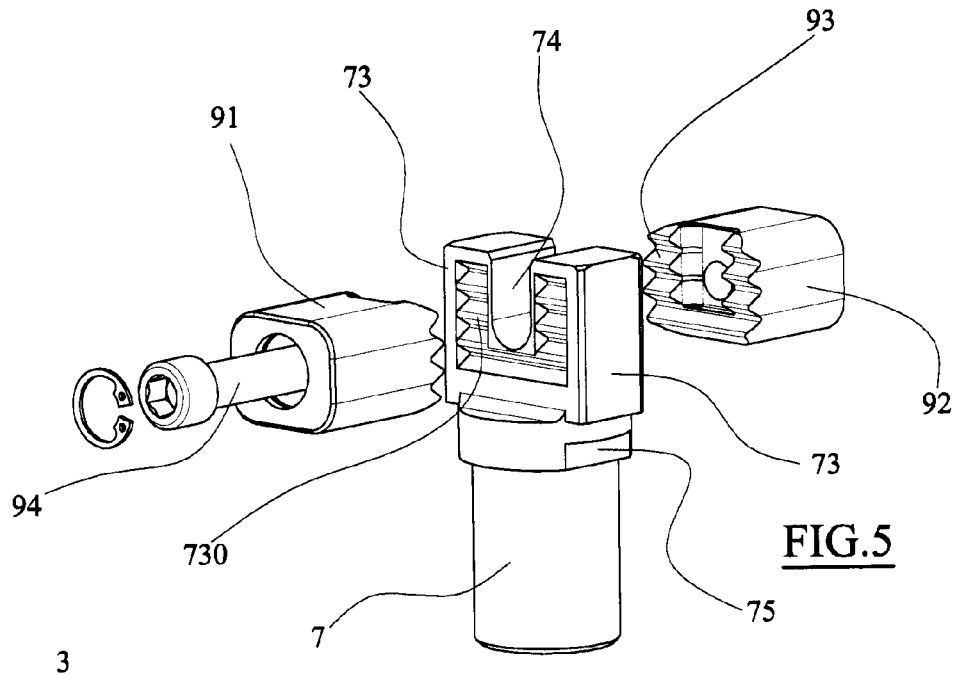
FIG. 5 is a larger-scale detail of FIG. 4.
Figure 4:
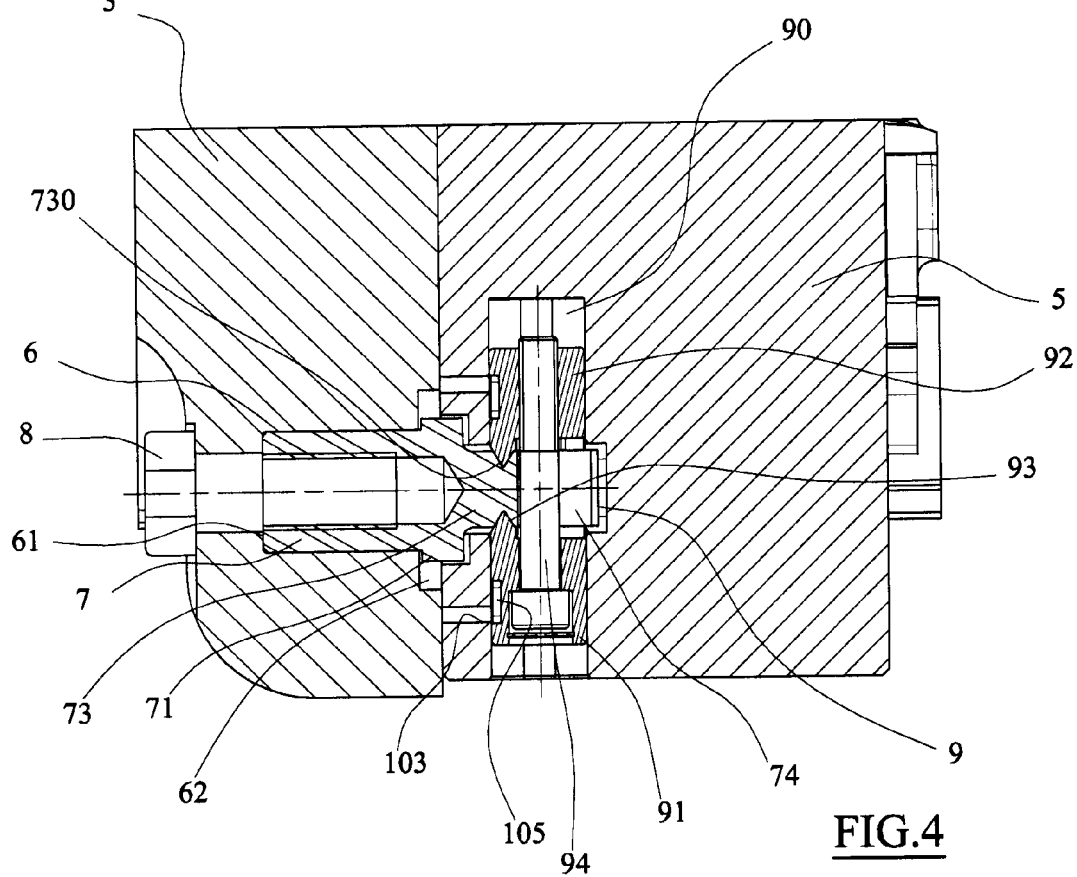
FIG. 4 is second IV-IV of FIG. 2.

In a first embodiment (FIGS. 4 and 5) each fastening device comprises a through-hole 6 having differentiated sections afforded in the traverse.

A cylindrical spur 7 is snugly inserted in the hole 6 and is provided with a broadened portion 71, which is prolonged beyond the traverse 3.

The broadened portion 71 is partly contained, with a considerable radial play, in the larger-diameter portion 62 of the hole 6.

The spur 7 is rested against a first abutment 61 of the differentiated-section hole 6, and retained there by the bolt 8 which is screwed into an axial cavity of the spur.

The broadened portion 71 of the spur is prolonged into two appendages 73 facing and opposite and separated by an axial space 74.

The opposing surfaces of the appendages 73 exhibit channels 730 having axes that are perpendicular to the axis of the space 74.

The half-die 5 to be assembled to the traverse 3 exhibits a hole 9 having differentiated sections destined to be placed coaxial to the hole 6.

The hole 9 is destined to snugly receive the appendages 73.

The two appendages 73 are symmetrical with respect to the axis of the spur, and exhibit channels 730 on the external surface which channels 730 are straight and have triangular sections having an axis perpendicular to the axis of the spur 7, and facing externally.

The body of the half-die 5 is further provided with a hole 90 having an axis perpendicular to the axis and intersecting the axis of the hole 9, and opening externally on the side of the half-die. The hole 90 has a quadrangular section, but could have any section.

Two holes 103 are comprised at the hole 90, which holes 103 are perpendicular to the hole 90 and open onto the surface of the half-die, and are destined each to contain a guide pin, not illustrated, which projects into the hole 90.

The hole 90 is crossed by the channeled part of the appendages 73, and slidably snugly houses two symmetrical nuts 91 and 92, which on the two flat facing surfaces exhibit channels 93 complementary to the channels 730 present on the appendages 73.

The nut 91 is simply inserted on a bolt 94, while the opposite nut 92 is screwed to the threaded end of the bolt.

The stalk of the bolt 94 is positioned in the space 74 between the appendages 73.

The pin, not illustrated, projects from each of the holes 103 internally of a channel 105 afforded on a side of the nut facing the hole 103.

The orientation of the spur 7 internally of the hole 6 can be defined at the design stage by predisposing two opposite faced-off sections 75 (FIG. 5) which are situated in complementary seatings afforded in the traverse 3. The orientation of the faced-off sections 75 is parallel to the axis of the space 74.

The first mounting of the half-die on the traverse is performed as follows.

Leaving the bolt 8 slightly loose, the spur 7 is orientated such that the oppositely-situated faced-off sections 75 are located in the complementary seatings afforded in the traverse 3, and the space 74 between the appendages 73 can house the stalk of the bolt 94, guaranteeing that the axis of the channels 730 is parallel to the axis of the channels 93.

The position of the spur 71 is then blocked by the bolt 8, and the operation is repeated for each of the fastening devices provided between the mobile traverse and the half-die.

Then the half-die can be associated to the traverse simply by inserting the appendages of the spurs in the facing holes of the half-die, and activating the bolts 94 such as to lock the nuts 91 and 92 against the appendages.

The two faced-off sections 75, or another equivalent abutment, are not indispensable. In this case the first mounting of the half-die is performed, leaving the bolt 8 loose, by inserting the two appendages 75 and performing a first tightening of the bolts 91 and 92. In this way the spur self-orientates in the correct position, and can be blocked by tightening the bolt 8.

Then the process continues as reported above.

Since the design of the traverse of the press on which the half-dies are to be mounted is known, when designing the half-dies the only specification that has to be respected is the coaxial arrangement of the holes 9 of the half-die with the holes 6 of the traverse, while the third hole has to be orientated parallel to the faced-off sections 75.

In a second embodiment (FIGS. 6 and 7), where the same numerical references are used to indicate the parts corresponding to those of the first embodiment, the two appendages 73 derive from the base of a plate 700 which is fixed, with a fixed and predetermined orientation, to the traverse 3 of the press by four screws 702 housed in the holes 701 and acting on the bottom of the hole 6.

The orientation of the plate is in this case defined by a crest 703 present on the plate which inserts in a corresponding cavity of the traverse.

The two holes 9 and 90 afforded in the half-die 5 which open externally will during the design stage of the half-die have to be orientated such as to be respectively coaxial to the hole 6 and correctly orientated with respect to the orientation of the channels 730 deriving from the plate 700 and the crest 703. The realisation modes are easily understandable from what has been stated in relation to the first embodiment.

Clearly the part of the fastening element comprising the spur, if the dimensions of the traverse and the half-die permit it, can be advantageously associated to the half-die, while the part comprising the fastening bolts can be realised in the traverse.

This enables a considerable cost saving, as any number of half-dies can be associated to a same traverse, and the machining of the part comprising the spur is much easier to do.

The invention is not limited to the above-described examples and variants and improvements thereto may be made without forsaking the ambit of the claims that follow.

The invention claimed is:

1. A system comprising a support body, the support body being a plane or a plate constituting a mobile traverse (3) or a fixed platen (2) of a press (1), a half-die (5) associated to the support body (2,3), at least a first hole (6) afforded in the support body (2,3) or in the half-die (5) and aligned with a second hole (9) afforded respectively in the half-die (5) or in the support body (2,3), a third hole (90) intersecting the second hole (9) and opening externally on an edge of the half-die (5) or the support body (2,3), a connector (7,700) having a part inserted and blocked in the first hole (6) by means of a fastener (8,702) and a part (73) projecting from a surface of the support body (2, 3) or the half-die (5) in which the first hole is located and inserted in the second hole (9), the projecting part being provided with a space (74) parallel to an axis of the first hole (6), which separates the projecting part into two symmetrical appendages (73), a blocking member (91, 92, 94) located in the third hole (90) such as to act on the part (73) of the connector (7,700) inserted in the second hole (9), the blocking member (91, 92, 94) being activatable from the outside of the half-die (5) or the support body (2,3), the fastener (8,702) between the first hole (6) and the part of the connector inserted therein being independently tightenable with respect to the orientation of the connector (7,700) in the first hole (6).

2. The system of claim 1, wherein opposite surfaces of the symmetrical appendages (73) comprise first channels (730) that are parallel and have a triangular section and a constant pitch, having an axis which is perpendicular to an axis of the space.

3. The system of claim 1, wherein the fastener is a head bolt (8) and the connector part inserted in the first hole is a cylindrical spur (7) blocked in the first hole by the head bolt (8) and comprises a member adapted to provide a desired orientation in the first hole.

4. The system of claim 3, wherein the member adapted to provide the desired orientation are two faced-off portions (75) afforded on the surface of the spur, which portions are destined to snugly insert in complementary faced-off portions fashioned in the first hole (6).

5. The system of claim 1, wherein the fastener is screws (702) and the connector part inserted in the first hole is a cylindrical plate (700) blocked in the first hole with a desired orientation and connected to the support body (2, 3) or the half-die (5) in which the first hole is located by the screws (702) acting between the cylindrical plate and a bottom of the first hole.

6. The system of claim 5, wherein the connector part inserted in the first hole comprises a member adapted to provide a desired orientation in the first hole, the member adapted to provide the desired orientation is a crest (703) fashioned on the base of the cylindrical plate (700), configured to insert snugly in a complementary channel afforded in the bottom of the first hole.

7. The system of claim 1, wherein the blocking member comprises two nuts (91, 92) inserted unrotatably in the third hole, joined by a bolt (94) passing between the symmetrical appendages.

8. The system of claim 7, wherein opposite surfaces of the symmetrical appendages (73) comprise first channels (730) that are parallel and have a triangular section and a constant pitch, having an axis which is perpendicular to an axis of the space, and wherein the nuts (91, 92) have facing surfaces and wherein the facing surface of each one of the nuts (91, 92) is provided with second channels (93) complementary to the first channels (730) present on the two appendages (73).

* * * * *